April 9, 1940.  P. BORNKESSEL  2,196,175
DEVICE FOR GRILLING AND OTHER COOKING OPERATIONS
Filed Jan. 8, 1935  2 Sheets-Sheet 1
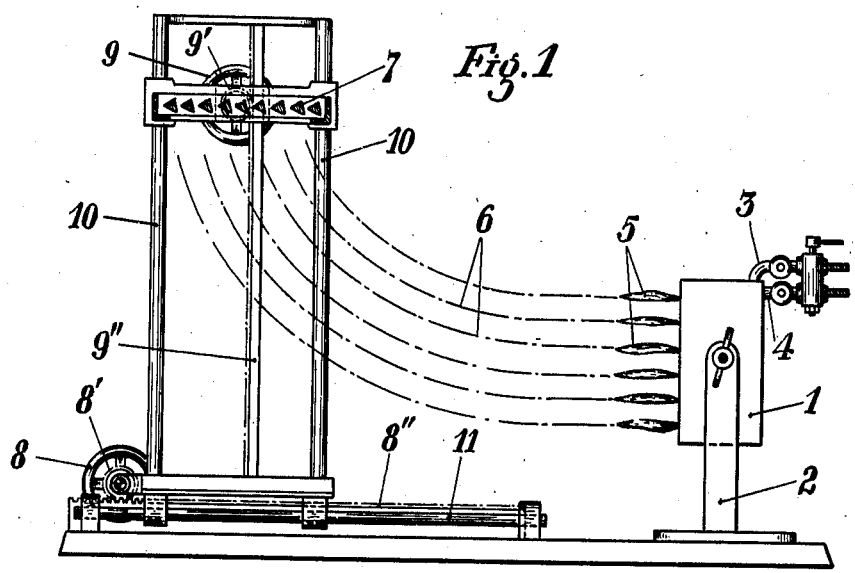
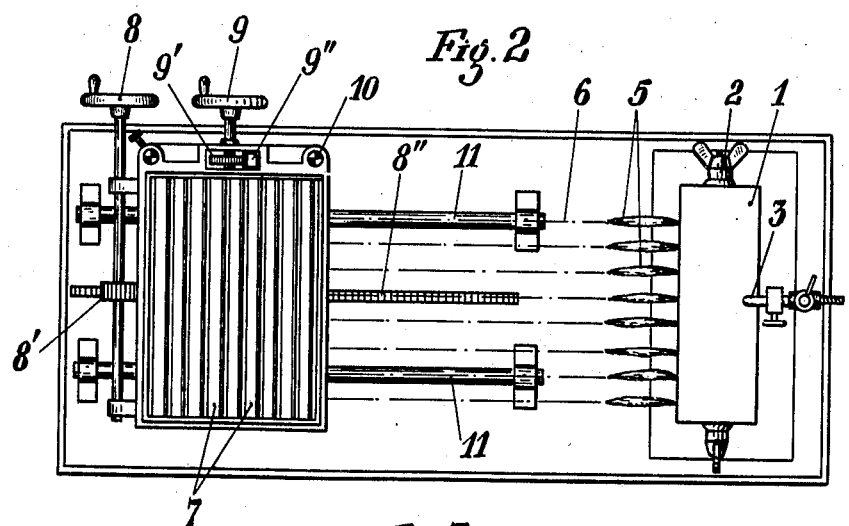
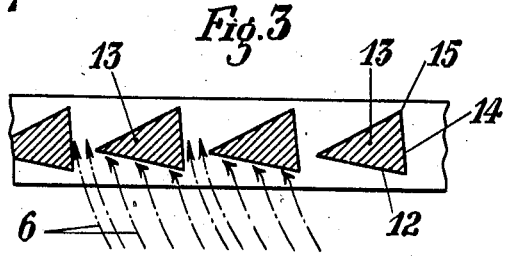
Inventor:
Paul Bornkessel
by his Attorney

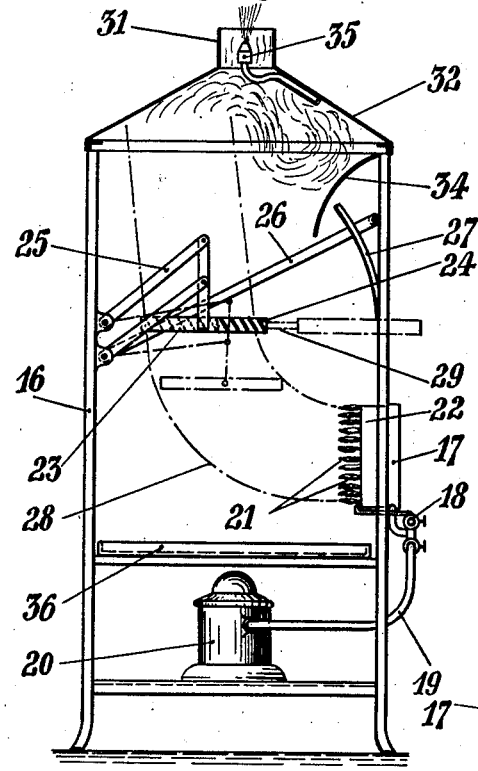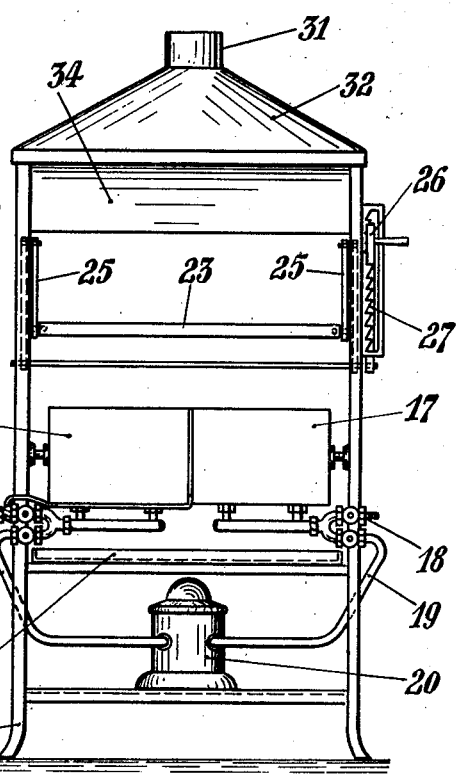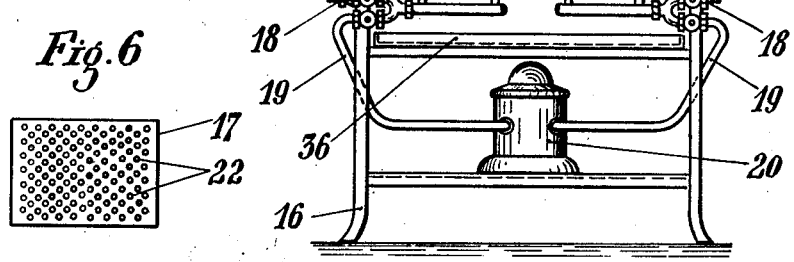

Patented Apr. 9, 1940

2,196,175

UNITED STATES PATENT OFFICE 2,196,175

DEVICE FOR GRILLING AND OTHER COOKING OPERATIONS

Paul Bornkessel, Berlin, Germany, assignor to firm F. Kuppersbuch & Sohne A. G., Gelsenkirchen, Germany Application January 8, 1935, Serial No. 822
In Germany January 4, 1934

4 Claims. (Cl. 126—41)

My invention relates to gas burner grills of simple and efficient construction and economical to operate.

In carrying out the invention I employ burners having small flames, and so arranged that the burnt gases reach directly the piece of meat or other object to be treated, in the shape of a restricted hot current of gas flowing at high velocity in the natural direction of flow, without any deviation or baffling. The gases do not suffer in their course any deviation which might reduce the energy of the flow and diminish the heat of said gases. The burners "having small flames," means that the burners produce narrow and long flames by applying high pressure to the air or to the gas or to the mixture of air and gas.

The hot and rapid current of the gases of combustion produces, in a sense, an excess of heat on the piece of meat to be broiled. The pores of the meat close up when the meat is touched by the current of hot gases, so that not a drop of the meat juice can come out or be lost. This remarkable fact has been proved by various tests. By my arrangement it is possible to grill meat which until now was considered improper for grilling owing to its consistence or to its natural poverty in juice.

Besides, my new process increases the rapidity of the grilling process. According to this process a normal piece of meat is completely grilled and finished in two or three minutes, without preliminary heating of the oven or of the grill, whereas the usual processes take several times that long, and generally also require that the grilling chamber or oven be pre-heated. This entails a considerable economy in gas.

The rapidity of the grilling process makes possible novel uses of grilled food. This very quick and simple grilling process is of particular importance in restaurants. The grilled food may be prepared in a very short time without any preparations or special knowledge even by persons who are not specialists, for instance when the food has to be prepared after the kitchen is closed for regular business.

The usual grills use burners whose flames do not give any force of impact. The hot gases of these burners flow freely through the grilling device and surround the meat on all sides and do not form a restricted stream of hot gases of any appreciable speed and do not impinge with force on the meat. Usually a closed cover or hopper is employed in which the required grilling temperature is progressively developed, and in which, owing to the absence of air, the gases cannot burn completely. The result is that the grilled food loses its taste. If the hopper is removed, the heating of the meat is further slowed down.

The juice runs out of the open pores of the meat when the grilling starts because the heating is progressive and often affects only the outside of the meat. Valuable components are thus lost and the meat loses its quality and taste. The complete grilling process takes so long that in restaurants orders for grilled food are usually few.

The force of impact of the gases from the burners, on which the action of the new process is mainly dependent can, according to the invention, be increased by increasing the speed of flow of said gases by means of a suitable suction or delivery (pressure) effect, for instance, by the use of blowers or exhaust fans. A greater speed of delivery not only increases the force of impact itself, but causes at the same time the introduction of a greater quantity of air around the flames. This air is strongly heated and acts with the current of gases during the grilling process.

The device for carrying out carrying out the process according to the invention comprises one or several burners having thin and narrow flames and so arranged that the flames extend mainly in a horizontal direction.

While per se such burners are known, their present use has a special and new significance. Only by directing the flames horizontally can the restricted and very rapid flow of gas be produced. The grill can be easily moved into the stream of gas. The intensity of the gas current being small, the person attending to the grill is not inconvenienced by the heat. In order more exactly to position the stream of gas to satisfy different conditions, according to the invention, the burner is pivoted around its longitudinal horizontal axis, so that the position and the suction of the stream of gas may be regulated within definite limits.

Rocking burners are also known, but in quite different combinations. Usually their object is to produce above or below a completely closed fire place.

The details of the invention will appear from the following description with reference to the annexed drawings, in which several examples are shown.

Fig. 1 is a side view of the general arrangement of the installation according to the invention, Fig. 2 is a corresponding plan view, Fig. 3 is a section through part of the grill, on a larger scale.

Fig. 4 is a side view, partly in section and

Fig. 5 is a front view of one embodiment,

Fig. 6 is a front view of a burner alone.

In Figs. 1 and 2, the box-shaped burner 1, which produces narrow and thin flames, is suspended to rock around its principal horizontal axis in a frame 2, so that the flames 5 which emerge burn in a horizontal direction for the position shown. By slightly inclining the burner 1 the direction of the flames the cross section of the stream of hot gas may be varied within fixed limits. The feeding of the mixture of air and gas at a suitable pressure is effected through the pipes 3 and 4. The complete burner 1 is composed of several burner units, which give a certain number of vertical and horizontal rows of narrow flames 5. This multiplicity of flames in the burner produces a stream of hot gases of large total cross section. At least three narrow flames arranged in a triangle are used. They are placed at such distances from each other that the suction effect of each flame extends at least directly into the zone of action of the suction of the neighbouring flames. Thus, a non divided stream of hot gas is obtained, which extends over a relatively long distance and is formed in front of the flames, said stream having a diameter equal to the sum of the flames and is sucking in from the outside considerable quantities of air, which considerably increases the intensity of the gas stream. The vertical and horizontal rows of burner units in the total surface of the burner 1, may be considered as a multitude of burners mounted in triangle, the different triangles of flames being so placed with respect to each other that the suction effect of a triangle of flames extends into the active suction zone of the neighboring triangles.

As already mentioned, the large number of flames or triangles of flames produces a heavy stream of hot gases which extends for a long distance. If only one flame of the same total dimensions were used then, in order to obtain a gas stream of corresponding size a much larger flame, i. e., one whose volume is much greater than the total volume of the separate small flames, would have to be used. In other words, the suction effect and the force of impact of the small flames must be equal to the total suction effect and to the total force of impact. A single large flame would consume more gas than the small separate flames and a much longer flame would be formed, because the length of a flame increases as its suction increases. A long flame cannot be maintained and it loses its force of impact. It would be necessary to increase the dimensions of the installation.

The stream 6 of burnt gases follows its natural trajectory of flow, which is a parabola, and impinges without any hindrance on the grate or grill 7, on which the piece of meat to be roasted or treated is carried. The grill 7 can be moved parallel to the direction of flow of the stream of burnt gases so as to be always in the stream itself, whether said piece is near or far from the flames. In the embodiment of Figs. 1 and 2 the grill is shown as movable in vertical and horizontal direction. The horizontal displacement of the grill on rails 11 is effected by a hand wheel 8 by means of toothed wheels 8' and racks 8". The vertical displacement is effected in the frame 10 by means of the hand wheel 9, again through the intermediary of toothed wheels 9' and racks 9". The grate remains completely free in the stream of hot gases, as shown in Figs. 1 and 2.

The displacement of the grill may also be operated, as will be explained further on, by a single hand lever, so that the grate always remains horizontal in the stream of hot gases, without any special adjustment. This arrangement has the advantage that the grill can be displaced at will during operation. Preferably, the grill is engaged also to be removed from the stream of gas. This is of importance when the process of grilling must be suddenly interrupted without cutting off the burners.

To further reinforce the action of the rapid stream of burnt gases on the meat, the grill which supports the meat is provided with guiding surfaces which bend and direct the gases directly onto the meat, without any appreciable counter effect. As shown in Fig. 3, the bars 13 of the grill have a triangular cross section and are so arranged that one longitudinal edge 15 of each bar is placed on top. The bars are so arranged that the lower surface 12 of each is slightly inclined upwards in the direction of the stream of gas and that the smooth surface 14 of each bar, joined to said surface 12, is also slightly inclined in the direction of the stream 6. Thus the stream of hot gases is not disturbed and is directed straight onto the meat supported by the grill, without any harmful counter-current.

Figs. 4 and 5 show a complete restaurant installation of a grill according to the invention. The frame 16 carries the burner 17 with its feed pipes for gas 18 and for air 19. The air pipe is connected with a compressor 20. The burner 17 shoots out the thin flames 21, whose ensemble is shown in Fig. 6. According to Fig. 6, the burner 17 has a large number of holes 22 arranged in triangles.

Above and at a certain distance from the burner 17 the grill 23 is mounted which, in this case, is composed of flat inclined iron bars 24. These flat sloping iron bars also permit the stream of burnt gases to pass freely and they act as guiding surfaces for the stream. The grill is fixed in a frame 25 which may be controlled by means of a single lever 26 whose different positions are determined by stepped supports 27. The frame 25 is so connected to the grill that by moving the lever 26 the grill always remains horizontal and thus describes approximately a parabola corresponding to the (dotted) trajectory 28 of the stream of gas. The grill can thus be displaced very simply and very easily in the stream of gas. An auxiliary device 29 for displacing the grill allows displacement of the grill in the horizontal plane only, a stop being provided to limit the return movement towards its normal position.

In the example shown in Figs. 4 and 5, there is provided, above the grill 23, a hopper 32 which has in the centre an exit 31 for the gases. Said hopper should be at such a distance from the grill that any return of the gases, which would interfere with the grilling process is prevented. The hopper serves to evacuate from the kitchen the unavoidable vapours. Since the stream of gas (Fig. 4) is directed obliquely upwards, the stream may be partly reflected by the wall of the hopper 32 in front of the burner and thus inconvenience the operator behind the burner. To avoid this inconvenience, a special baffle plate 34 is provided which guides the flow of gas towards the exit 31. A pipe 35 in exit 31 is supplied with air under pressure so as to increase the velocity of flow of the burnt gases.

Having now fully described my said invention, what I claim and desire to secure by Letters Patent, is:

1. In a stove for grilling food and other cooking operations, in combination, a support for the food, a compressed air and gas burner for heating the food, said burner being disposed below and at a relatively large distance from said support, said burner being disposed completely outside the vertical planes passing through the edges of said support, said burner producing a solid current of heated gases, the said compressed air guiding and confining the said hot current in lateral directions, whereby said current remains laterally confined for the distance between the burner and the said support, said burner directing said hot current to said support along the natural trajectory of said current, whereby substantially no heat radiation occurs.

2. In a stove for grilling food and other cooking operations, in combination, a support for the food, a compressed air and gas burner for heating the food, said burner being disposed below and at a relatively large distance from said support, said burner being disposed completely outside the vertical planes passing through the edges of said support, said burner producing a solid current of heated gases, the said compressed air guiding and confining the said hot current in lateral directions, whereby said current remains laterally confined for the distance between the burner and the said support, said burner directing said hot current to said support along the natural trajectory of said current, whereby substantially no heat radiation occurs, said burner comprising a flat nozzle provided with at least three flame apertures, the latter being disposed at corners of a triangle and spaced apart such distance that the zones of suction of the individual flames intersect to form a solid blast of flames, whereby a centripetal suction is produced, drawing the heat generated inside the said blast of flames.

3. In a stove for grilling food and other cooking operations, in combination, a support for the food, a compressed air and gas burner for heating the food, said burner being disposed below and at a relatively large distance from said support, said burner being disposed completely outside the vertical planes passing through the edges of said support, said burner producing a solid current of heated gases, the said compressed air guiding and confining the said hot current in lateral directions, whereby said current remains laterally confined for the distance between the burner and the said support, said burner directing said hot current to said support along the natural trajectory of said current, whereby substantially no heat radiation occurs, said burner comprising a flat nozzle provided with at least three flame apertures, the latter being disposed at corners of a triangle and spaced apart such distance that the zones of suction of the individual flames intersect to form a solid blast of flames, whereby a centripetal suction is produced, drawing the heat generated inside the said blast of flames, said stove further comprising a carrier for adjustably supporting the said burner, whereby the position of said burner nozzle with respect to said support may be altered, and means for adjustably supporting the said food support with respect to the burner.

4. A gas stove adapted for grilling and other cooking operations, comprising a support for the food and a burner disposed laterally below and at a relatively large distance from said support, said burner being completely outside the vertical planes passing through the edges of said support, so that said burner is outside the range of substances falling from said support, such as dripping fat, an inlet for supplying gas and an inlet for compressed air connected to said burner, said burner being positioned so as to direct substantially horizontal flames in general direction toward said support, the said compressed air guiding the flames to a point below and spaced away from said support and producing an inwardly directed suction in the current of flames issuing from the burner, whereby substantially no heat is laterally dissipated or radiated, the heat of said flames when released, rising upwardly in a laterally confined current along its natural trajectory to heat the said support.

PAUL BORNKESSEL.

CERTIFICATE OF CORRECTION.

Patent No. 2,196,175. April 9, 1940.

PAUL BORNKESSEL.

It is hereby certified that the name of the assignee in the above numbered patent was erroneously described and specified as "F.KUPPERSBUCH & SOHNE A. G." whereas said name should have been described and specified as --F. KÜPPERSBUSCH & SOHNE A. G.--; as shown by the record of assignments in this office; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.